March 2, 1965  R. C. WILSON  3,171,451
SAW POSITIONING AND GUIDE DEVICE
Filed March 1, 1963  2 Sheets-Sheet 1
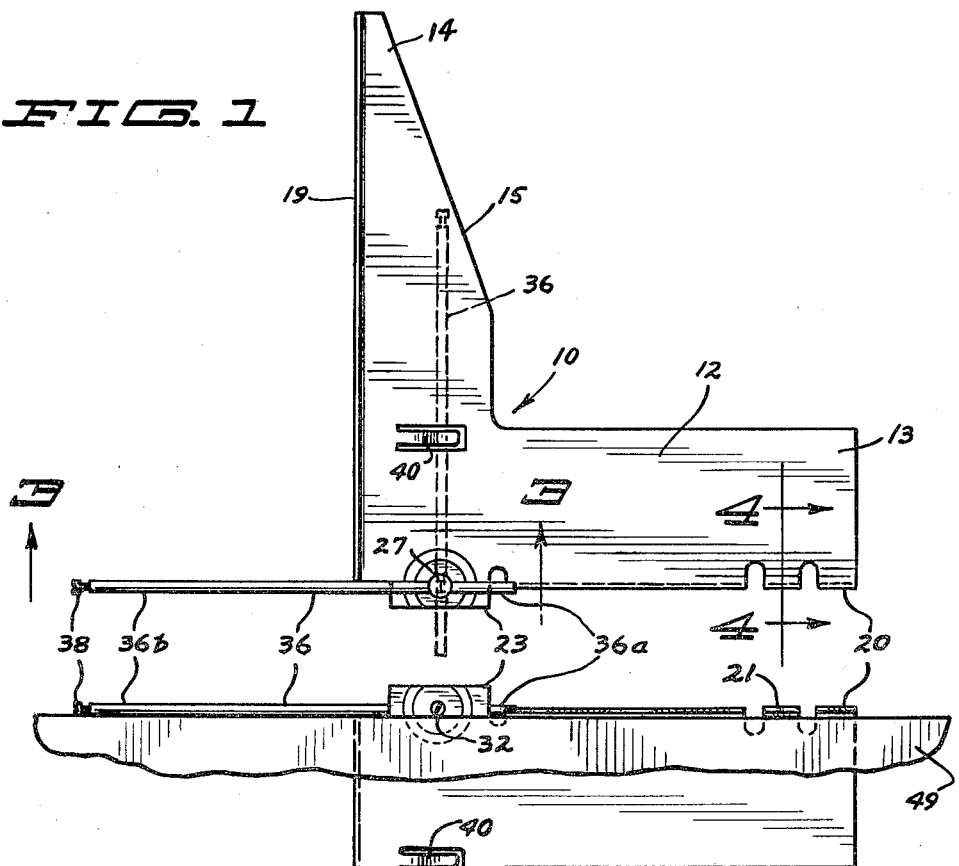
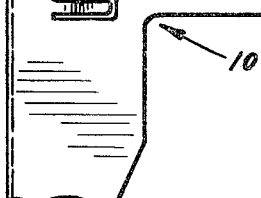
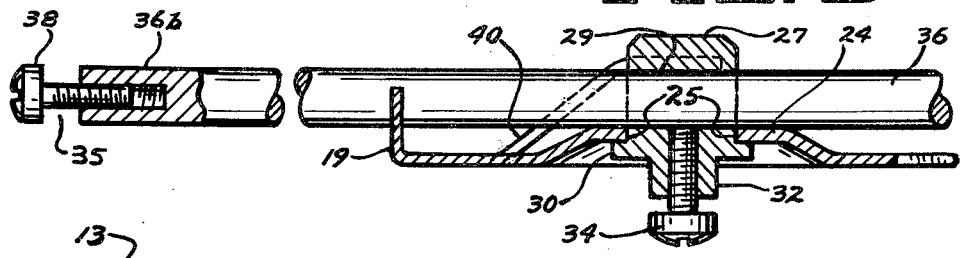
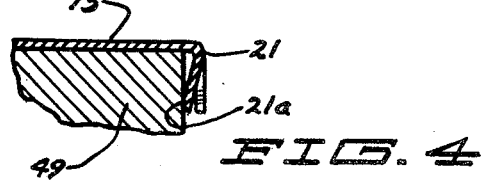
INVENTOR.
RICHARD C. WILSON
BY
ATTORNEYS

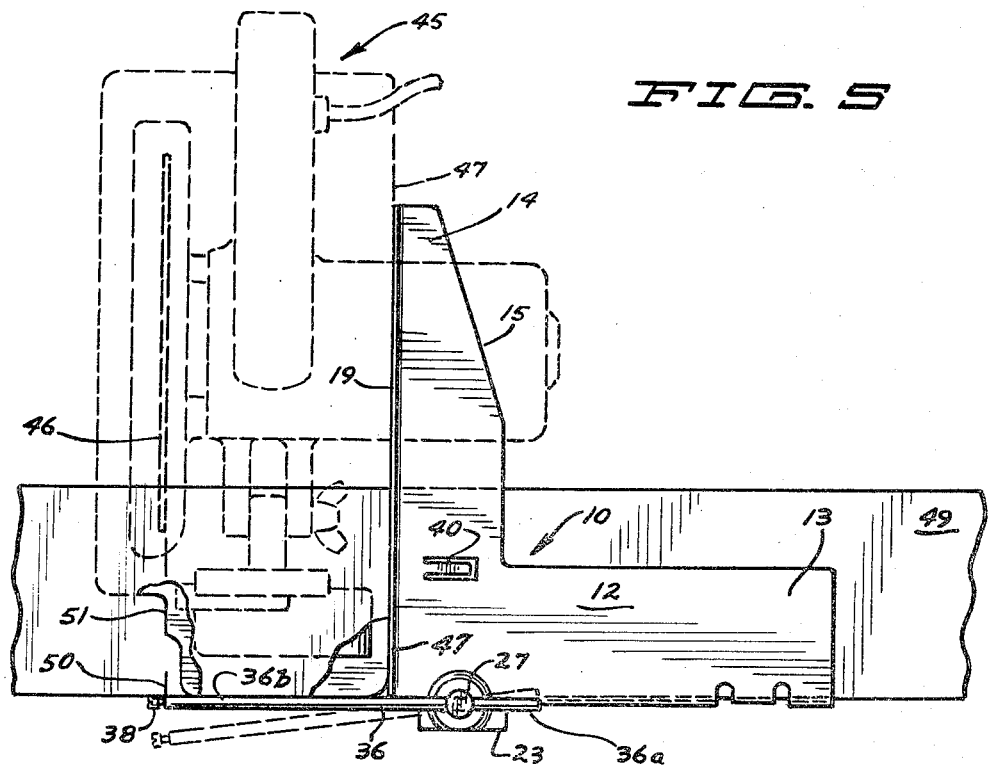
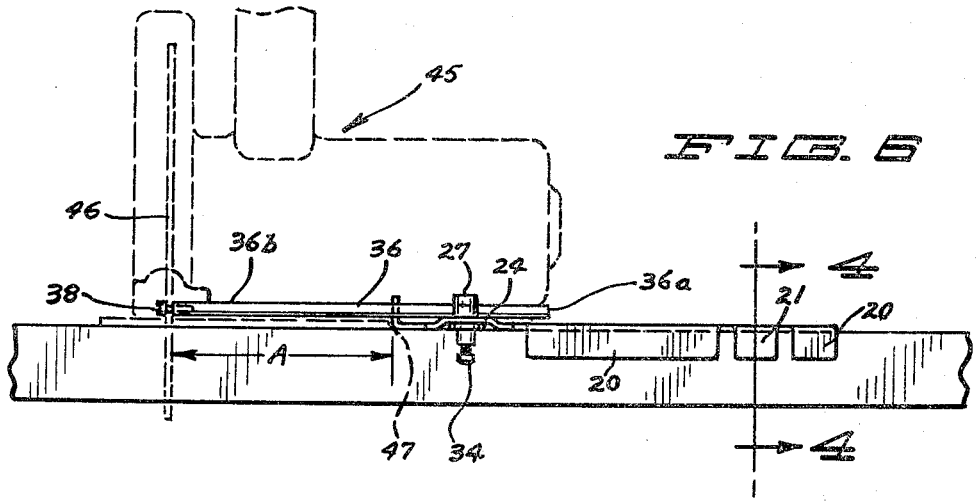

United States Patent Office 3,171,451
Patented Mar. 2, 1965

3,171,451
SAW POSITIONING AND GUIDE DEVICE
Richard C. Wilson, Box 26, Champlin, Minn.
Filed Mar. 1, 1963, Ser. No. 262,157
1 Claim. (Cl. 143—6)

This invention relates to a cross cut positioning and guiding device for an electric hand saw.

Knowledge is had of devices in use which guide the travel of an electric hand saw, but it is believed that the applicant's device represents a substantial improvement in this art in accurately positioning the hand saw in addition to guiding it to make the desired cut.

It is a common practice to attempt to align the blade of the saw with the line of the cut to be made. Particular skill is required to position the plane of the blade into coincidence with the plane of the cut to be made. It is necessary to maintain correct alignment of the saw blade by paying particular attention to it as the cut is being made. It is desirable to have a device therefore which will not only properly position the saw but which will accurately guide it to make a desired cut.

It is an object therefore of this invention to provide a unitary means for positioning and guiding an electric hand saw with reference to a cross cut.

It is another object of this invention to provide a device comprising a gauge which is designed to provide a correct position for an electric hand saw to align the saw blade with the cut to be made and provide a guide for the saw throughout the full extent of the cut.

It is another object of this invention to provide means gauging the width of a kerf relative to a cut to be made by an electric hand saw, predetermining the position of said kerf relative to the line of cut to be made, and accurately aligning the saw blade with the predetermined position of said kerf.

In connection with the previous object, it is a further object of this invention to provide a guide for said hand saw through the full extent of the cut to be made, and means permitting said gauge to be dislodged and moved to a non-interfering position by the saw in its cutting operation.

It is also an object of this invention to provide a device of the type above indicated, comprising means to adjust said device to provide an accurate right-angled guide relative to a cross cut to be made in connection with a given work piece.

These and other objects and advantages of the invention will be fully set forth in the following description made in connection with the accompanying drawings in which like reference characters refer to similar parts throughout the several views and in which:

FIG. 1 is a top plan view of applicant's device with a portion shown in dotted line and a portion shown in alternate position;

FIG. 2 is a bottom plan view of applicant's device with portions broken away and portions shown in dotted line;

FIG. 3 is a view on an enlarged scale in vertical section taken on line 3—3 of FIG. 1 as indicated, with portions thereof broken away and a portion thereof shown in dotted line;

FIG. 4 is a fragmentary view on an enlarged scale taken on line 4—4 of FIG. 1 as indicated;

FIG. 5 is a view similar to FIG. 1 with applicant's device in operating position on a work piece with portions broken away and a saw indicated in dotted line; and FIG. 6 with reference to FIG. 5 is a view of applicant's device in end elevation in operating position.

With reference to the drawings, applicant's device is indicated generally by the character 10. The device may be variously formed to carry out the applicant's inventive concept which is to provide a unitary means for positioning and guiding a hand electric saw. In a preferred embodiment of applicant's device as here shown, said device comprises a plate member 12 illustrated as being right-angled in form having one leg portion 13 and a second leg portion 14 in a coplanar relationship therewith with each having some degree of width and leg portion 14 being shown having a tapered inner side portion 15 as a matter of design.

Said leg 14 has an upstanding flange 19 for substantially its full extent at its outer side edge portion. Said leg portion 13 has a depending flange 20 extending for the greater portion of its outer edge. Said flange 20 has a separated portion in the form of a tab or nib 21 formed therein for a purpose to be hereinafter described. It is understood that flanges 19 and 20 are disposed in planes at right angles to one another.

Extending outwardly of said leg portion 13 adjacent the point of intersection of the leg portions 13 and 14 and forwardly of the adjacent end of the flange 20 is an apron 23 in the plane of said plate member 12. Said apron has an upwardly upset or raised circular portion 24 having an aperture 25 therein. The center of said aperture will be in alignment with the plane of said flange 20.

Extending upwardly through said aperture 25 is a stub pin or shaft 27 having a transverse bore 29 therethrough and having an annular shoulder 30 forming a stop member bearing against the under side of said upset portion 24. Depending from said collar 30 is a stub shank 32 having a diameter of reduced size, as will be described, and having an axial tap therethrough to the bore 29 receiving a set or locking screw 34 therein. Said set screw will have a head of the same diameter as said stub shank 32.

A gauge rod 36 is provided to have one end portion disposed through said bore 29 to be adjustably secured therein by said screw 34. Said rod 36 will be indicated as having an inner end portion 36a and outer end portion 36b. Said end portion 36b is axially tapped to receive a fillister head screw 38. Thus it is seen that said gauge rod 36 is pivotally mounted in said pin 27 and extendible outwardly of said flange 19 to form a right angle therewith.

The stub shank 32 and the gauge rod 36 will have the same sized diameters. The inner sides of said stub shank and said gauge rod when in extended position at right angles to the flange 19 will thus be in a plane somewhat inwardly of the plane of said flange 20. The nib 21 will be angled inwardly as indicated in FIG. 4, to have its lower inside edge portion 21a in the plane of the inner sides of said gauge rod and stub shank. The flange 19 will be designed to terminate in this same plane, as indicated in FIG. 1.

Struck upwardly from said plate member 12 is a tongue 40 having an angled free end portion to receive said rod 36 to form a locking or holding member therefor.

A representation of an electric hand saw 45 is shown dotted in operating position comprising a saw blade 46 and a guide edge 47 extending the length of the outer edge of the base plate of the saw remote from the blade. In broken view, a work piece 49 is shown representing a wood member such as a plank, a joist or the like.

*Operation*

Applicant's device will first be adjusted in connection with the saw to be used therewith. The gauge rod will be pivoted to be in alignment with the flange 20 and will be extended beyond the flange 19 for a distance which represents the distance between the near surface of the saw blade 46 and the outer surface of the guide edge 47 of said saw 45, which distance is indicated by the reference line in FIG. 6 indicated by the character A. The screw 34 is loosened for adjustment of the extension of said gauge rod 36 and then tightened to fix this adjusted position of the gauge rod relative to saw 45. This measurement will extend only to the end 36b of said gauge rod and will not include the extent of the end screw 38.

Reference is next had to the work piece 49 through which a cross cut is to be made at point 50. Electric hand saws commonly have a base plate edge portion 51 extending forwardly of the inner surface of the saw blade and this edge portion is aligned with the cutting line. The saw is generally free hand guided across the work piece. An electric hand saw is difficult to guide accurately. The guide edge 51 is two to three inches forward of the saw blade and further, the last two or three inches of the cut are guided by memory only. Allowance must also be made for the kerf of the saw blade. It is extremely difficult to accurately align the blade at one side of the cutting line or the other. Thus in common practice it is extremely difficult to make an accurate cross cut.

With applicant's device no cutting line is required. A point is sufficient to indicate the line of cut, such as point 50, at the side edge of the work piece.

Applicant's device will be placed on the work piece with the depending flange 20 disposed over the leading edge thereof. From the above description it is noted that the stub shank 32 and the lower edge of the rib 21 will bear against the leading edge of the work piece so that there will be a two point contact. The remaining portion of the flange 20 will be spaced slightly from engagement with said work piece and will provide a holding means for the fingers of the operator in holding the device in operating position. The above described two points of contact lie in a plane at right angles to the plane of the flange 19 and the inner side of the gauge rod 36 in abutting the adjacent end of the flange 19 will also lie in the same plane as said two points of contact.

The end of the gauge rod 36 will be aligned with the point 50. The end of the gauge rod will be right over the point and very close thereto making a very accurate alignment relatively simple.

The end screw 38 will be adjusted so that the gap 35 between it and the adjacent end of the rod 36 represents the width of the saw blade or the width of the kerf to be made. Thus applicant's device may be positioned with a high degree of accuracy to position the cut to be made at one side or the other of the point 50 or it may readily be centered thereover. The operator with one hand will hold the device 10 as positioned firmly in place.

The saw is taken in hand and the guide edge 47 thereof will be butted up against the upstanding flange 19 and will be kept bearing against this flange as the cut is made. There is no need to watch the saw. The saw is positively positioned and an accurate uniform cut will result.

As the saw advances across the work piece it will nudge the gauge rod 36 out of its path and said gauge rod pivots readily. Thus said gauge rod does not require the attention of the operator during the cutting operation.

When not in use, the gauge rod 36 may be pivoted to overlie the plate member 12 and be engaged by the holding tongue 40.

Thus it is seen that the applicant has provided a very simply constructed and simply applied device to very accurately position and guide an electric hand saw in a cross cutting operation. The same high degree of accuracy is present in making a cross cut with the applicant's device as is present in the use of elaborate and expensive equipment such as radial arm and table saws.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claim.

What is claimed is:

A positioning and guide device for an electric hand saw in connection with a work piece having in combination,
   a unitary plate member having a pair of outer side portions at right angles to one another and coplanar with one another,
   a flange upstanding from one of said side portions longitudinally thereof forming a saw guide member,
   a flange depending from the other of said side portions being arranged and positioned to engage the side portion of said work piece remote from the side portion thereof adjacent the operator of said saw to position said upstanding flange of said device of said work piece,
   a raised pivot carried by said plate member having its axis in alignment with said other side portion,
   a guide rod carried by said pivot arranged for axial adjustment relative thereto,
   a headed screw threaded axially into one end of said guide rod, the head of said screw being adapted to be spaced from the adjacent end of said rod the width of the kerf to be made,
   the end portion of said upstanding flange adjacent said other side portion of said device forming a stop member for said guide rod to position the same to be aligned with said other side portion of said device,
   said guide rod being extensible to a predetermined length to position said device relative to the line of cut whereby with the saw blade on the line of cut said saw will bear against said upstanding flange, and
   said guide rod is movable out of the way of said saw by the advancing edge of said saw at substantially the point of completion of the cut of said saw through the full extent of said work piece.

References Cited by the Examiner
UNITED STATES PATENTS 2,632,483   3/53   Jamack.
2,822,834   2/58   Hammers.

FOREIGN PATENTS 934,789   11/55   Germany.

WILLIAM W. DYER, Jr., *Primary Examiner.*
LEON PEAR, *Examiner.*